US008829872B1

(12) United States Patent
Pierson et al.

(10) Patent No.: US 8,829,872 B1
(45) Date of Patent: Sep. 9, 2014

(54) SYSTEMS AND METHODS FOR DROPPING AND/OR ADDING PHASES IN MULTIPHASE REGULATORS

(75) Inventors: Richard Pierson, Newport Beach, CA (US); Benjamim Tang, Rancho Palos Verdes, CA (US)

(73) Assignee: Infineon Technologies Austria AG, Villach (AT)

( * ) Notice: Subject to any disclaimer, the term of this patent is extended or adjusted under 35 U.S.C. 154(b) by 399 days.

(21) Appl. No.: 12/503,782

(22) Filed: Jul. 15, 2009

(51) Int. Cl.
*G05F 1/00* (2006.01)

(52) U.S. Cl.
USPC .............................. 323/272; 323/282; 363/65

(58) Field of Classification Search
USPC ............. 323/282, 283, 284, 285, 272; 363/65
See application file for complete search history.

(56) References Cited

U.S. PATENT DOCUMENTS

| | | | |
|---|---|---|---|
| 7,007,176 B2* | 2/2006 | Goodfellow et al. | 713/300 |
| 7,023,182 B1* | 4/2006 | Kleine et al. | 323/212 |
| 7,161,332 B1* | 1/2007 | Kleine et al. | 323/222 |
| 2007/0013350 A1* | 1/2007 | Tang et al. | 323/237 |
| 2008/0301337 A1* | 12/2008 | Dreps et al. | 710/56 |
| 2009/0146622 A1* | 6/2009 | McDonald et al. | 323/238 |
| 2012/0091977 A1* | 4/2012 | Carroll et al. | 323/271 |

* cited by examiner

*Primary Examiner* — Jue Zhang
*Assistant Examiner* — Lakaisha Jackson
(74) *Attorney, Agent, or Firm* — Murphy, Bilak & Homiller, PLLC

(57) ABSTRACT

Methods and systems for dropping and/or adding phases in multiphase regulators according to various aspects of the present invention may operate in conjunction with multiple output circuits configured to deliver power to a load and a controller. The controller may be connected to each of the output circuits, such as to drive the output circuits. The controller may be adapted to selectively disable and/or enable phases. For example, the controller may disable one output circuit without disabling another output circuit. In addition, the controller may smoothly reduce the power delivered to the load by the output circuit prior to disabling it, for example to control output glitches.

23 Claims, 5 Drawing Sheets

SYSTEMS AND METHODS FOR DROPPING AND/OR ADDING PHASES IN MULTIPHASE REGULATORS

CROSS-REFERENCES TO RELATED APPLICATIONS

This application claims the benefit of U.S. Provisional Patent Application No. 61/080,979, filed Jul. 15, 2008, and incorporates the disclosure of such application by reference.

BACKGROUND OF INVENTION

Switching power supplies are popular for high power applications because of their high efficiency and the small amount of area/volume they require. Popular switching supply topologies include buck, boost, buck-boost, forward, flyback, half-bridge, full-bridge, and SEPIC topologies. Buck converters are particularly well suited for providing the high current at low voltages needed by high performance integrated circuits, such as microprocessors, graphics processors, and network processors.

Power consumption and thermal management are major issues in modem computer systems. In systems with many processors, some of the processors are often in idle or less than full power states. When the processors are in this low power state, the power consumption of the power supply may be reduced to minimize the total system power consumption and dissipation.

One drawback to multiphase regulators, such as buck DC-DC converters, is that considerable power is used during light load conditions to switch the multiple buck conversion phases. As a result, the efficiency of multiphase converters can be poor at light loads. In addition, as more phases are added to improve full load efficiency, the light load efficiency decreases. The most efficiency sensitive applications often use more phases to improve the full load efficiency, but sacrifice medium load and light load efficiency. In many applications, processors spend a majority of the time operating in the medium load range and only use peak load current for short durations. Systems are consequently over designed, resulting in higher costs for cooling, AC-DC power supplies, and AC power used.

At medium and lighter loads, fewer phases may be used to provide the load current. Fewer active phases makes a converter more efficient at the typical processor load currents. One problem is that modern processors can change the load demand very quickly (within microseconds) so that the converter must respond to this change in current without an overload (too much current) condition in any of the phases.

In multiphase controllers, phase dropping (aka phase shedding) and phase adding have been implemented in a variety of ways. Multiple methods exist for determining when to drop or add phases for optimum efficiency. Typically, dropping or adding phases is done without regard to the timing of the switch mode regulator. This can result in large temporary voltage variations, often referred to as glitches, at the output of the regulator.

SUMMARY OF THE INVENTION

Methods and systems for dropping and/or adding phases in multiphase regulators according to various aspects of the present invention may operate in conjunction with multiple output circuits configured to deliver power to a load and a controller. The controller may be connected to each of the output circuits, such as to drive the output circuits. The controller may be adapted to selectively disable and/or enable phases. For example, the controller may disable one output circuit without disabling another output circuit. In addition, the controller may smoothly reduce the power delivered to the load by the output circuit prior to disabling it, for example to control output glitches.

BRIEF DESCRIPTION OF THE DRAWING

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of components configured to perform the specified functions and achieve the various results. For example, the present invention may employ various process steps, apparatus, systems, controllers, output stages, switches, drivers, sensors, etc. Further, the present invention may employ any number of conventional techniques for regulating voltage, regulating current, sensing voltage and current, controlling phases, and the like.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps. Many alternative or additional functional relationships or physical connections may be present in a practical system.

Figure 1:
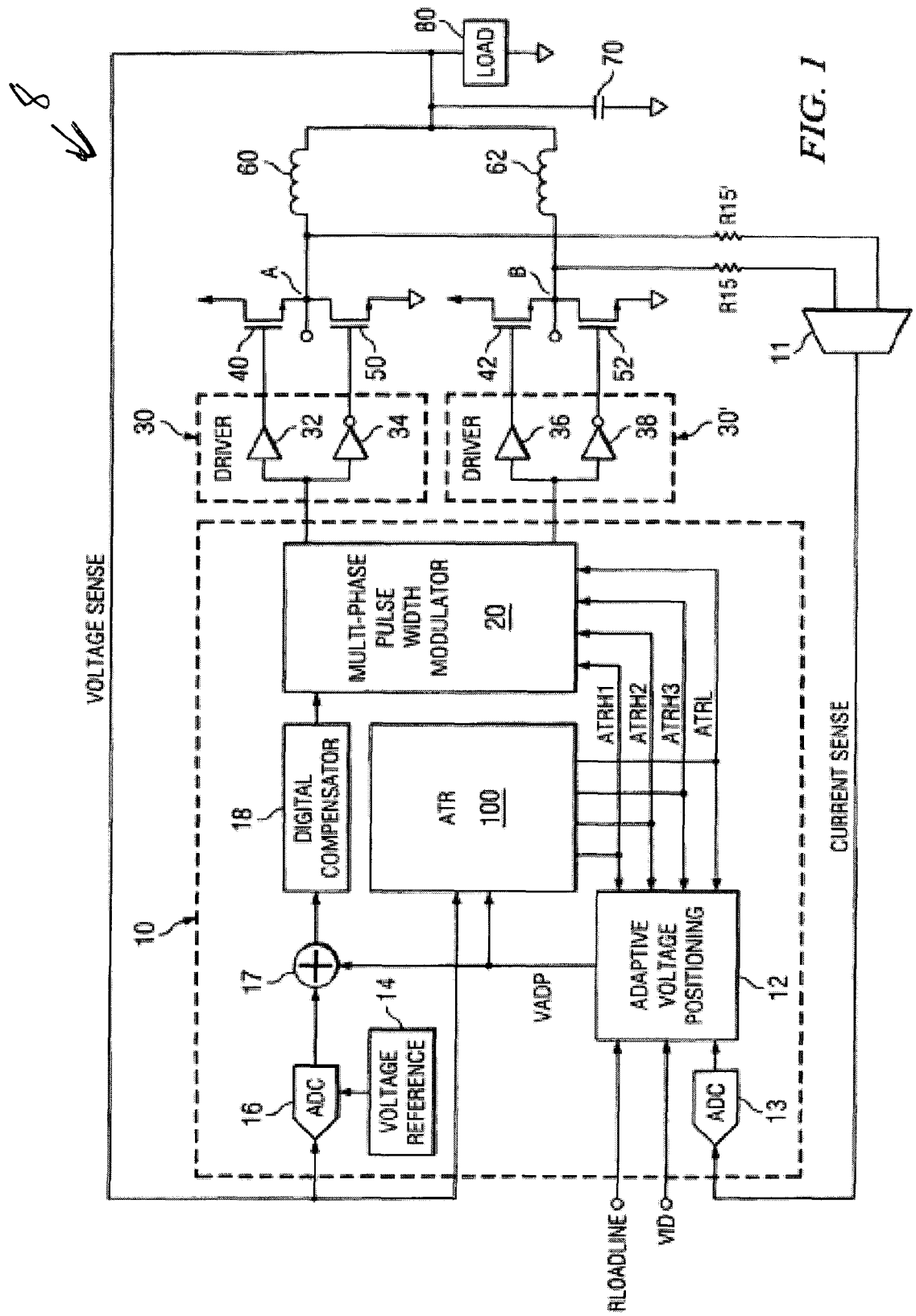
FIG. 1 is a schematic of an exemplary digital multiphase buck regulator.

Referring now to FIG. 1, a power supply according to various aspects of the present invention may comprise a multiphase regulator, such as a digital multiphase buck regulator 8, which is also often referred to as a digital multiphase buck converter because it converts a relatively high supply potential (+V), such as 12 volts, to a low voltage, such as 1 to 3 volts. The regulator 8 may provide power to a load 80 at high current levels. The regulator 8 may comprise any appropriate systems and elements for providing the required power to the load 80.

In the present exemplary embodiment, the regulator 8 comprises a controller 10 and multiple phases of output circuits. The output circuits deliver power to the load 80. The output circuits may comprise any systems for providing power to the load 80 according to one or more signals from the controller 10. In the present exemplary embodiment, the output circuits comprise multiple driver circuits 30, 30' and multiple output stages. The driver circuits 30, 30' drive the output stages to provide power to the load 80. The controller 10 controls the driver circuits 30, 30'. The controller 10 may control the driver circuits 30, 30' according to various criteria and/or inputs, such as current and/or voltage feedback signals.

The load 80 may comprise any appropriate system that receives power. In the present embodiment, the load 80 may comprise a microelectronic component, such as a microprocessor requiring very accurate power that is regulated and maintained during rapidly changing power requirements. The load 80 may comprise, however, any suitable system for utilizing and/or transferring power or the like.

The load 80 receives power from the output stages. The output stages deliver power from the relatively high supply potential (+V) to the load 80 according to signals from the driver circuits 30, 30'. The output stages may comprise any appropriate systems for providing power to the load 80 according to signals from the driver circuits 30, 30' and/or the controller 10. For example, each phase may include an output stage comprising a high side switch, a low side switch, and an inductor. Each output stage may charge a capacitor 70 and supply power to the load 80.

In the present embodiment, the switches comprise transistors, such as field effect transistors (FETs), but may comprise any appropriate elements for delivering power to the load 80 in response to signals from the driver circuits 30, 30' and/or the controller 10. A first phase output stage may comprise a high side FET 40, a low side FET 50, and an inductor 60. The first phase FETs 40, 50 have their drain-source paths connected in series at a common point A between a first potential source (+V) and a second potential source (ground). Similarly, a second phase output stage may comprise a high side FET 42, a low side FET 52, and an inductor 62 connected in a similar manner. Additional phases may be added. In various embodiments, low side FETs 50, 52, inductors 60, 62, and capacitor 70 may comprise discrete devices.

The output stages may be controlled via the driver circuits 30, 30'. The driver circuits 30, 30' drive the output stages according to signals from the controller 10. The driver circuits 30, 30' may comprise any appropriate elements for driving the output stages according to signals from the controller 10, and may comprise discrete components and/or may be integrated into the controller 10 and/or the output stages.

Each phase may be associated with a particular driver circuit. For example, phase 1 may be driven by a noninverting driver 32 and an inverting driver 34. Driver 32 drives the gate of FET 40 with a signal that is complementary to the output of driver 34 that drives the gate of FET 50. Likewise, the output stage of phase 2 is driven by noninverting driver 36 and inverting driver 38 in the same way that circuits 32 and 34 receive the pulse width modulate signals during phase 1. Driver 36 drives the gate of FET 42 and driver 38 drives the gate of FET 52. Note that although two phases are shown, any number of phases can be used. A larger number of phases may provide smoother and more accurate power to the load.

In the present embodiment, the FETs 40, 50 are N-channel devices, so only one of the two transistors is on at any particular time. If either transistor in a particular driver circuit 30, 30' were replaced with a P-type transistor, then the same phase signal could be used to drive the gate of both transistors 40, 50. In either case, a direct current path between the high supply potential +V and ground is avoided.

The controller 10 controls the operation of the regulator 8 to provide power to the load 80. The controller 10 may comprise any appropriate system and/or circuits for controlling the power, such as a processor, logic devices, memory systems, and the like. In the present embodiment, the controller 10 provides signals to the driver circuits 30, 30' to drive the various phases. In addition, the controller 10 may receive various input signals, such as signals corresponding to load voltage, current provided by one or more phases, and/or other relevant information.

The controller 10 may be configured in any suitable manner to perform the relevant operations, and various functions may be performed by one or more elements. In the present embodiment, the controller 10 comprises a pulse width modulator (PWM) 20 and a compensator 18. The PWM 20 provides signals to the driver circuits 30, 30' to drive the various phases. The compensator 18 provides a duty cycle signal to the PWM 20 to adjust the pulse width of the signals provided to the various phases.

The PWM 20 may comprise any suitable system for pulse width modulating the signals provided to the driver circuits 30, 30' and/or otherwise controlling the various phases. For example, the PWM 20 may comprise a conventional digital multi-phase pulse width modulator. In various embodiments, the PWM 20 may comprise a distinct power stage. The output of PWM 20 is a series of pulses on each of the output lines, the phase 1 output being provided to driver circuit 30 and the phase 2 output being provided to driver circuit 30'. In a multi-phase system having more than two phases, additional phases are connected in a similar manner.

The compensator 18 may provide any suitable signal to the PWM 20 to modify the width of the pulses provided to the drivers 30, 30', of each of the two phases in the illustrated example, and other phases, when utilized. The compensator 18 may comprise any appropriate system or circuit, such as a conventional digital compensator. The compensator 18 may further provide signals to the PWM 20 according to any suitable inputs and/or criteria, such as the load voltage and/or a reference voltage. In the present embodiment, a reference voltage 14 is applied to an analog-digital converter (ADC) 16 that also receives, as a second input, the voltage at load 80. The output of the ADC 16 may be calibrated according to the reference voltage 14. The output of ADC 16 is a digital voltage value that may be compared to a target voltage and provided as a digital error voltage to the compensator 18.

In operation, during phase 1, while the pulse width modulated waveform turns high side FET 40 on, current flows through FET 40 into node A and through inductor 60 to charge capacitor 70 and provide power to load 80. On the other hand, when low side FET 50 is turned on, current flows through FET 50. High side FET 42 and low side FET 52, connected in common at node B, operate in a similar manner during phase 2. The voltage from the load 80 is fed back to ADC 16 so that the voltage to the load can be adjusted to changing load conditions.

The controller 10 may also control the power provided to the load 80 according to other criteria and information. For example, the controller 10 may receive measurements of the current provided by each phase, such as at node A and node B (and other corresponding nodes in systems with more phases). In addition, the controller 10 may provide for more rapid response to high speed variations in the power requirements of load 80, such as via supplemental voltage adjustment techniques. For example, when the voltage excursion from a load line exceeds a predetermined specified amount, then a secondary power adjustment may be provided by an active transient response (ATR) circuit 100. In one embodiment, the controller 10 receives a VID input. The VID is a digital number provided by the microprocessor manufacturer describing specific power requirements, in particular the set point, i.e., initial load line voltage minimum current.

For example, the controller 10 may include an adaptive voltage positioning (AVP) circuit 12. The AVP circuit 12 may receive one or more inputs, such as an RLOADLINE input, a value provided by microprocessor manufacturers indicating the desired slope of the load line. The AVP circuit 12 may receive an additional input from a current ADC 13. In the present embodiment, current from all the phases at the nodes (such as node A and node B in the illustrated two-phase example) is sensed through resistor R15 and resistor R15', clocked through multiplex circuit 11 at the active phase time, and converted to a digital value in ADC 13. The AVP circuit 12 may provide an adjustment to the target voltage number provided to a comparator 17 and the ATR circuit 100. Thus, the target voltage may be determined and/or adjusted by the AVP circuit 12, such as by adjusting the target voltage in accordance with the specified load line. In addition, the AVP circuit 12 may receive inputs from the ATR circuit 100 for providing early and predictive correction of the target voltage, as will be described in greater detail below.

The ATR circuit 100 may detect the voltage and/or current level at the load 80 and provide a signal to PWM 20 accordingly, such as according to the magnitude of a deviation of the load 80 voltage from the target voltage. In one embodiment, the ATR circuit 100 compares the load voltage to one or more thresholds. In the event that the transient voltage at the load 80 deviates from the target voltage by one or more of the pre-set thresholds, the ATR circuit 100 may provide a signal to PWM 20 that is a function of the amplitude of the deviation of the detected voltage from the target voltage. For example, the ATR circuit 100 output may be one of ATRL, ATRH1, ATRH2, or ATRH3 as described in U.S. patent application Ser. No. 10/938,031, filed Sep. 10, 2004, by Tang, et al.

The ATR circuit 100 may also provide such ATR event signals to the AVP circuit 12. This enables AVP 12 to provide an early, predictive change to summer 17. This predictive change can occur prior to the time that the sensed current change is received from ADC 13 because the sensed load current change is delayed passing through inductors 60, 62, and other similar inductors in additional phases.

As long as the voltage at the load is maintained within predetermined limits, ATR circuit 100 is not activated and no output signals are provided by ATR circuit WO. However, when the changes in power demands by the load result in a voltage excursion at the load that exceeds the predetermined limits, ATR circuit 100 provides ATRL, ATRH1, ATRH2, or ATRH3 signals to PWM 20 to correct the voltage deviation rapidly and with minimal noise generation. As shown in FIG. 1, the same signals may be provided to AVP 12.

The regulator 8 may automatically and/or autonomously adapt the operating mode to maximize efficiency as the load current of the processor changes. For example, the controller 10 may control the number of phases providing power to the load 80. In particular, the controller 10 may optimize the power efficiency of the power regulator 8 by increasing and/or decreasing the number of active phases as described in U.S. patent application Ser. No. 11/480,715, filed Jul. 3, 2006 by Tang, et al, and published as Patent Publication No. 2007-0013350.

As described therein, the controller 10 may implement adaptive phase drop/add, as well as adaptive non-overlap timing, to optimize efficiency, such as over the entire range of load current for the relevant applications. Further, the controller 10 may vary the non-overlap delay between the turn-off of the synchronous FET and the turn-on of the control FET for each phase setting to further optimize efficiency. In addition, the ATR circuit 100 may implement a multi-level sensing technique to detect not only that a voltage excursion requires an active transient response, but may also detect the amplitude of the excursion. As the transient amplitude passes multiple thresholds, for example in the negative direction, all the previously disabled phases can be activated at once.

Figure 2:
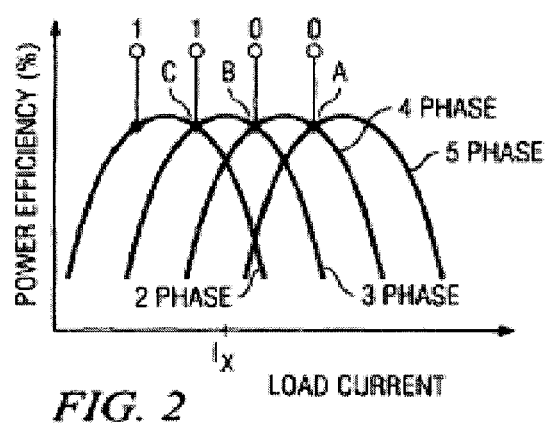
FIG. 2 is a diagram showing regulator efficiency as a function of load current.
Figure 3:
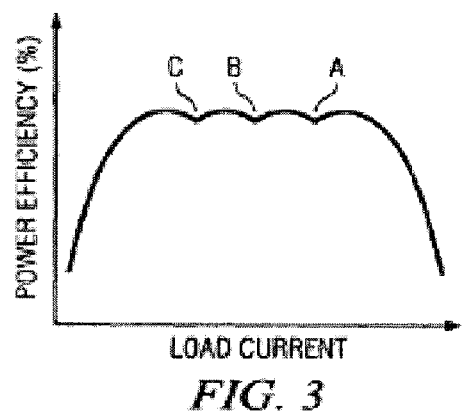
FIG. 3 is a composite diagram showing regulator efficiency as a function of load current.

Referring to FIGS. 2 and 3, power efficiency of the regulator 8 may be a function of load current. In this example, four waveforms are identified as 2 phase, 3 phase, 4 phase and 5 phase. With increased load current, the utilization of a larger number of phases optimizes efficiency. Thus, with a load current greater than at intersection point A, five phases (or more as the load current continues to increase) provide the greatest efficiency. At very low load current levels (e.g., to the left of intersection point C), a two phase system produces the highest efficiency. If load current were to continue to decrease, a one phase system would produce the highest efficiency.

In one example, the load current may be sensed as $I_x$ between intersection points B and C. In this current range, a three phase system provides the highest efficiency. Accordingly, the controller may activate or deactivate phases to configure the regulator 8 for three phase operation. Depending on the number of active phases operating prior to this current level, the number of phases is either increased or decreased to achieve 3 phase operation. The average current level at the intersection points, such as A, B, and C, may be measured and converted to a thermometer code as indicated in the diagram. Accordingly, the illustrated 1, 1, 0, 0 word represents an average load current level between intersection points B and C.

The controller 10 may drop and/or add phases in any appropriate manner, such as via slow or fast add and drop processes and systems as described in the previously cited U.S. patent application Ser. No. 11/480,715. In addition, the regulator 8 may be adapted to add and/or drop phases to control glitches at the output of the regulator 8. For example, randomly dropping or adding phases without regard to the timing of the regulator 8 may result in large glitches at the output of the regulator 8. The regulator 8 may control how phases are added and/or dropped to reduce the glitch at the output of the regulator 8 and/or provide an overall improved system performance when operating in a reduced and/or otherwise variable phase count state. In one embodiment, the controller 10 controls the addition or elimination of phases to smoothly or continuously (as opposed to abruptly) add or remove the contributions of the phases to be added or dropped, thus reducing potential output glitches. The controller 10 may selectively shed phases, for example by disabling one or more of the output circuits without disabling others. The controller 10 may also smoothly reduce the power delivered to the load by phases to be shed prior to disabling them, such as to reduce glitches in the output to the load.

Figure 4:
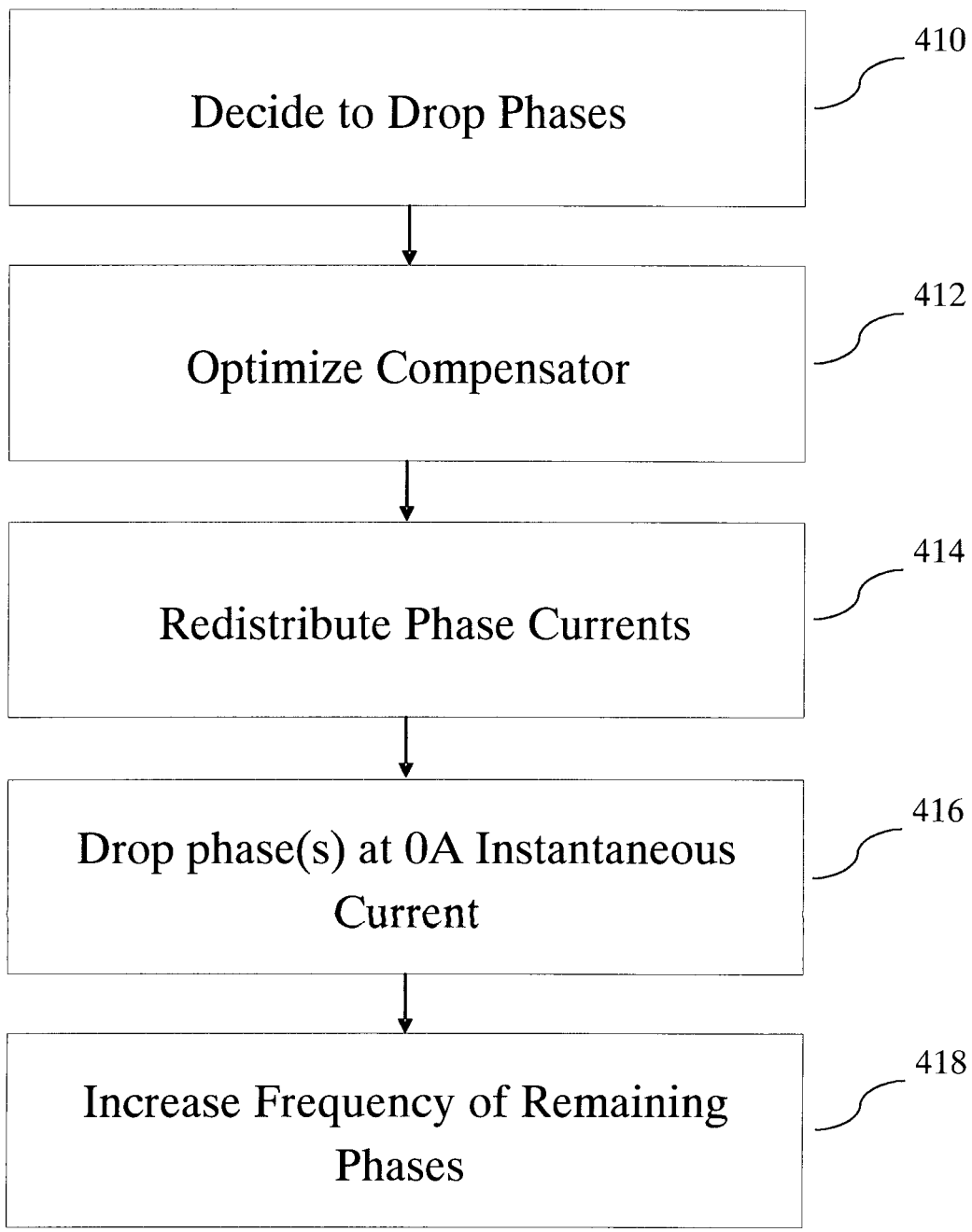
FIG. 4 is a block diagram of a process for dropping a phase.

For example, referring to FIG. 4, the regulator 8 may begin a process to drop one or more phases, such as according to the criteria and processes described above (410). The controller 10 may further optimize the loop compensation based on the adjusted lower phase count (412). The controller 10 may redistribute the current so that the phases to be dropped provide a reduced average current to the load, and the phases that remain active increase their current output to maintain the same overall output to support the load (414). Each of the phases to be dropped may be dropped when the instantaneous current of the phase is zero amps (416). Further, the frequency of the remaining active phases may be increased to reduce ripple in the output signal (418).

The phase dropping process may be initiated by any appropriate system or element of the regulator 8 or an external system. For example, the controller 10 may analyze one or more inputs, such as load current and/or voltage data, to determine whether and when to drop phases. In one embodiment, the phase dropping/adding analysis is performed autonomously by the PWM 20, the compensator 18, or another circuit integrated into the controller 10. Alternatively, the phase dropping/adding process may be initiated by an external system, such as a microprocessor or regulator monitoring system, and the decision for phase dropping/adding may be conveyed to the regulator 8, such as through a control input to the controller 10.

The controller 10 may adjust the compensation according to the change in the number of active phases. For example, in response to the decision to drop phases, the compensator 18 may optimize the loop compensation based on the new lower phase count. In the present embodiment, the compensator 18 may determine the number of phases that are to remain active and adjust the compensation accordingly. Thus, the controller 10 may adjusts a compensation of the regulator 8 according to a number of enabled phases.

The regulator 8 may redistribute the current provided by the phases to the load 80 so that the phases that are to remain active increase their output and the current provided by the phases to be deactivated is reduced. The output of the various phases may be adjusted over time to avoid discontinuities or other abrupt changes in the output voltage and/or current. For example, the PWM 20 may smoothly increase the output of the phases that are to remain active to supply the full current required by the load and smoothly reduce the output of those to be deactivated.

Figure 6:
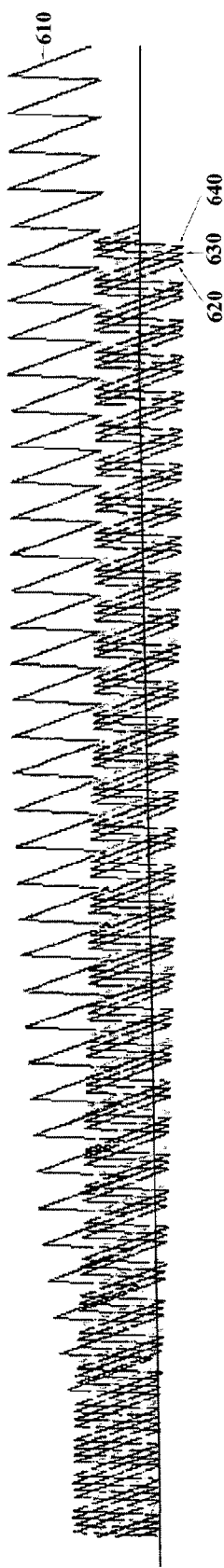
FIG. 6 illustrates the output voltage of each phase in a four-phase system as a function of time when dropping three phases.

For the phases to be dropped, the PWM 20 may reduce the contribution of the phases to the overall current provided by the regulator, such as gradually over time. In one embodiment, the PWM 20 adjusts the duty cycles, relative phases, frequencies, and/or other parameters of the phases to be dropped so that the average power or current supplied by the phases to be dropped is substantially zero. For example, referring to FIG. 6, a four-phase system may be adjusted to shed three phases. The average output current of the three phases to be dropped 620, 630, 640 is reduced to zero, for example by gradually reducing the DC component of the three phases to be dropped 620, 630, 640 to zero. In addition, the output current of the remaining phase 610 is increased to provide the entire load current.

The controller 10 may also selectively disable one or more phases when an instantaneous current provided by the phase to the load is substantially zero. For example, the controller 10 may disable each phase to be dropped 620, 630, 640 when the switching cycle of each phase 620, 630, 640 produces substantially zero instantaneous current. The low average current and the low instantaneous current of the phases to be dropped tends to provide a smooth transition as the phases are dropped, which may reduce the effects of the phase shedding on the output of the regulator 8.

Further, the controller 10 may increase the frequency of the remaining phases, such as according to a selected criteria and/or algorithm to provide a relatively smooth and regular output signal. For example, when high phase count systems are reduced to a low phase count, the output ripple of the regulator tends to increase. By increasing the frequency in the reduced phase count system, the ripple may be controlled. The controller 10 may increase the frequency of the remaining phases by any appropriate amount to maintain an acceptable ripple magnitude.

A corresponding process may be implemented for adding phases. For example, the controller 10 may add phases to one or more phases already providing power to the load 80 by smoothly and continuously adding the output of additional phases to the output provided by the other phases. By smoothly and continuously adding the phases, as opposed to abruptly adding the phases relative to the other phases, the tendency to induce glitches may be reduced.

Figure 5:
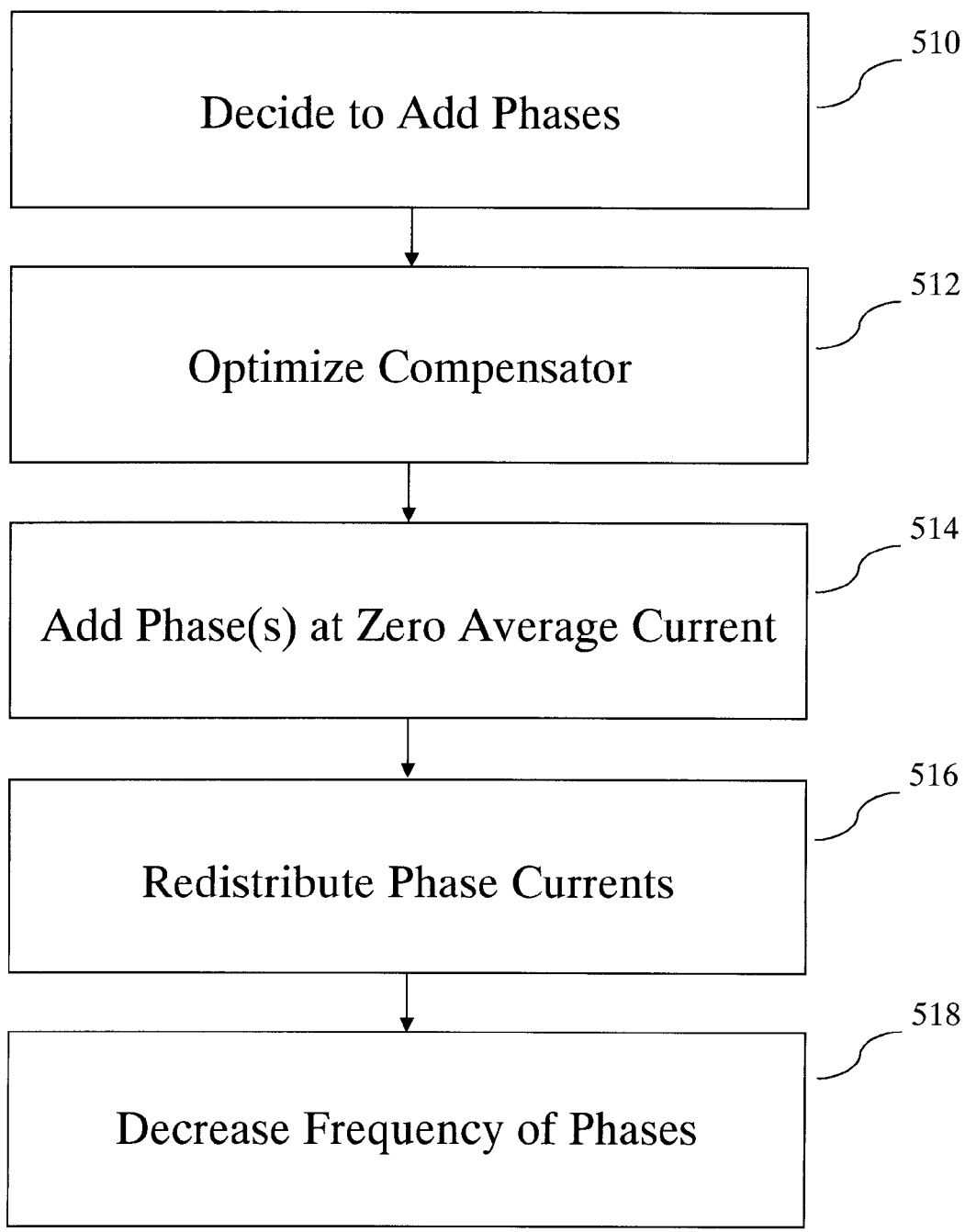
FIG. 5 is a block diagram of a process for adding a phase.

For example, referring to FIG. 5, when a decision to add a phase is made (510), the controller 10 may adjust the compensation according to the higher phase count (512). For example, the compensator 18 may optimize the loop compensation based on the new higher phase count. In the present embodiment, the compensator 18 may determine the number of phases to be active following the addition of the one or more phases and may adjust the compensation accordingly.

The controller 10 may also add the additional phases at zero average current (514). For example, the DC component of the output provided by each added phase may be ramped up from zero to the desired output. The phase relationship of each phase to be added may be adjusted so that the overall current delivered by the phases to be added is zero. The phase relationship between the phases to be added and the already activated phases may then be smoothly and continuously adjusted to increase the overall power delivered by the additional phases to the maximum desired amount.

The regulator 8 may also redistribute the current to be provided to the load among all the active phases (516), for example so that the phases that were already active decrease their output and the current provided by the phases to be added is increased. The output of the various phases may be smoothly and continuously adjusted over time to avoid discontinuities or other abrupt changes in the output voltage and/or current. For example, the PWM 20 may reduce the output of the phases that were already active to supply a reduced portion of the full current required by the load. For the phases to be added, the PWM 20 may increase the contribution of the phases to the overall current provided by the regulator, such as gradually over time.

Also, the frequency of the phases may be reduced for the new higher phase count system (518). For example, the controller 10 may reduce the frequency of the full set of phases, such as according to a selected criteria and/or algorithm. In one embodiment, when low phase count systems are increased to a high phase count, the output of the regulator 8 tends to become less subject to ripple. By decreasing the frequency in the reduced phase count system, the ripple may remain under control without operating at higher frequencies. The controller 10 may decrease the frequency of the phases by any appropriate amount to provide a relatively smooth and regular output signal without unacceptable ripple.

The various processes associated with adding and/or dropping phases may be implemented by any appropriate systems. For example, the various functions may be performed by the PWM 20, the compensator 18, and/or other elements of the controller 10. In addition, one or more functions may be implemented, initiated, or controlled by external devices, such as a processor connected to the controller 10 and instructing the controller 10 when, whether, and/or how to add or drop phases.

The invention has been described with reference to specific exemplary embodiments. Various modifications and changes may be made, however, without departing from the scope of the present invention as set forth. The description and figures are to be regarded in an illustrative manner, not a restrictive one, and all such modifications and changes are intended to be included within the scope of the present invention. Accordingly, the scope of the invention should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present invention and are accordingly not limited to the specific configuration recited in the specific examples.

Benefits, other advantages, and solutions to problems have been described with regard to particular embodiments. Any benefit, advantage, solution to problems, or any element that may cause any particular benefit, advantage, or solution to occur or to become more pronounced, however, is not to be construed as a critical, required, or essential feature or component.

The terms "comprises", "comprising", or any variation thereof, are intended to reference a non-exclusive inclusion, such that a process, method, article, composition, or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

The invention claimed is:

1. A power supply for supplying power to a load, comprising:
   a plurality of output circuits configured to deliver power to the load; and
   a controller connected to each of the output circuits, wherein the controller is adapted to:
      determine a number of the output circuits to remain enabled and a number of the output circuits to be disabled based on at least one of load current data and voltage data analyzed by the controller;
      begin a phase dropping process in continuous current mode during which at least a first one of the output circuits is selectively disabled without disabling at least a second one of the output circuits; and
      smoothly reduce the power delivered to the load by the first output circuit prior to disabling the first output circuit, by reducing a duty cycle of the first output circuit and increasing the duty cycle of at least the second output circuit so that the first output circuit continues to switch during the phase dropping process and phase currents of the output circuits are redistributed so that an average or instantaneous current provided by the first output circuit to the load is gradually reduced to substantially zero prior to disabling the first output circuit.

2. A power supply according to claim 1, wherein the controller is further adapted to selectively disable the first output circuit when the instantaneous current provided by the first output circuit to the load is substantially zero.

3. A power supply according to claim 2, wherein the controller is adapted to selectively disable the first output circuit after the average current provided by the first output circuit to the load has been reduced to substantially zero.

4. A power supply according to claim 1, wherein the controller is further adapted to smoothly increase the power delivered by the second output circuit while smoothly reducing the power delivered to the load by the first output circuit.

5. A power supply according to claim 1, wherein the controller is further adapted to increase a frequency of a signal for the power delivered to the load in conjunction with at least one of reducing the power delivered to the load by the first output circuits and disabling the first output circuit.

6. A power supply according to claim 1, wherein the controller comprises a compensator, and wherein the compensator adjusts a compensation of the power supply according to the number of enabled output circuits.

7. A multiphase switch mode voltage regulator for supplying power to a load, comprising:
   a plurality of output circuits configured to deliver the power to the load; and
   a controller, comprising a pulse width modulator (PWM) controlling the output circuits, wherein:
      the PWM drives the output circuits with a pulse width modulated signal at a frequency; and
      the controller is adapted to:
         determine a number of the output circuits to remain enabled and a number of the output circuits to be disabled during a phase dropping process, based on at least one of load current data and voltage data analyzed by the controller;
         reduce an average current provided by a first one of the output circuits to the load to substantially zero in continuous current mode prior to disabling the first output circuit, by reducing a duty cycle of the first output circuit and increasing the duty cycle of a second one of the output circuits so that the first output circuit continues to switch during the phase dropping process and to redistribute phase currents of the output circuits are redistributed so that the average current provided by the first output circuit to the load is gradually reduced to substantially zero prior to disabling the first output circuit; and
         disable the first output circuit without disabling the second output circuit as part of the phase dropping process:
            when an instantaneous current provided by the first output circuit to the load is substantially zero; and
            after the average current provided by the first output circuit to the load has been reduced to substantially zero.

8. A power supply according to claim 7, wherein the controller is further adapted to smoothly increase an average current provided by the second output circuit to the load while reducing the average current provided to the load by the first output circuit.

9. A power supply according to claim 7, wherein the controller is further adapted to increase the frequency in conjunction with at least one of reducing the average current provided by the first output circuit and disabling the first output circuit.

10. A power supply according to claim 7, wherein the controller comprises a compensator, and wherein the compensator adjusts a compensation of the power supply according to the number of enabled output circuits.

11. A method of disabling a phase of a multiphase power supply having a plurality of phases, comprising:
- determining a number of the phases to remain enabled and a number of the phases to be disabled by a controller of the multiphase power supply during a phase dropping process, based on at least one of load current data and voltage data analyzed by the controller;
- smoothly reducing a power delivered by a first one of the phases to substantially zero in continuous current mode prior to disabling the first phase, by reducing a duty cycle of the first phase and increasing the duty cycle of a second one of the phases so that the first phase continues to switch during the phase dropping process and the phase currents are redistributed so that an average or instantaneous current provided by the first phase is gradually reduced to substantially zero prior to disabling the first phase; and
- disabling the first phase without disabling the second phase after the power delivered by the first phase is smoothly reduced to substantially zero.

12. A method of disabling a phase of a multiphase power supply according to claim 11, wherein smoothly reducing the power comprises smoothly reducing the average current delivered by the first phase prior to disabling the first phase.

13. A method of disabling a phase of a multiphase power supply according to claim 11, wherein disabling the first phase comprises disabling the first phase when an instantaneous current provided by the first phase is substantially zero.

14. A method of disabling a phase of a multiphase power supply according to claim 13, wherein disabling the first phase comprises disabling the first phase after an average current provided by the first phase has been reduced to substantially zero.

15. A method of disabling a phase of a multiphase power supply according to claim 11, further comprising smoothly increasing the power delivered by the second phase while smoothly reducing the power delivered by the first phase.

16. A method of disabling a phase of a multiphase power supply according to claim 11, further comprising increasing a frequency of a signal for the power delivered by the second phase in conjunction with at least one of reducing the power delivered by the first phase and disabling the first phase.

17. A method of disabling a phase of a multiphase power supply according to claim 11, further comprising adjusts a compensation of the power supply according to the number of enabled phases.

18. A regulated power supply comprising a multiphase switch mode regulator configured to drop one or more active phases, wherein:
- a number of the active phases to remain enabled and a number of the active phases to be dropped during a phase dropping process are determined based on at least one of load current data and voltage data;
- a current output of a first one of the active phases to be dropped is reduced to zero amperes average current in continuous current mode prior to disabling the first active phase, by reducing a duty cycle of the first active phase and increasing the duty cycle of a second one of the active phases so that the first active phase continues to switch during the phase dropping process and the phase currents are redistributed so that an average or instantaneous current provided by the first active phase is gradually reduced to substantially zero prior to disabling the first active phase;
- a current output of the second active phase is increased as the output of the first active phase is reduced in the continuous current mode during the phase dropping process so as to maintain a substantially constant output current; and
- the first active phase is dropped when the first active phase is outputting substantially zero instantaneous current.

19. A regulated power supply according to claim 18, wherein the multiphase switch mode regulator optimizes a loop compensation based on the number of active phases that remain enabled after the first active is dropped.

20. A regulated power supply according to claim 18, wherein the multiphase switch mode regulator is further configured to increase a frequency of the phases to remain enabled.

21. A regulated power supply according to claim 18, wherein the multiphase switch mode regulator is further configured to drop a phase when dropping a phase would result in a higher power efficiency and add a phase when adding a phase would result in a higher power efficiency.

22. A regulated power supply according to claim 21, wherein the multiphase switch mode regulator is further configured to activate an additional phase when the additional phase provides substantially zero average current output.

23. A regulated power supply according to claim 22, wherein the multiphase switch mode regulator is further configured to redistribute output current such that:
- output current of the power supply is held substantially constant;
- an average output current of the additional phase is increased; and
- an average output current of one or more previously activated phases is decreased until the output of the additional phase and the output of the one or more phases previously activated is substantially equal to the average output current of the previously activated phases before adding the additional phase.

* * * * *